United States Patent

Willard et al.

[11] Patent Number: 6,075,688
[45] Date of Patent: Jun. 13, 2000

[54] MOTOR OPERATOR WITH AC POWER CIRCUIT CONTINUITY SENSOR

[75] Inventors: Frank G. Willard, Oakmont; John R. Klinvex, North Huntingdon, both of Pa.

[73] Assignee: Cleaveland/Price Inc., Trafford, Pa.

[21] Appl. No.: 09/100,288

[22] Filed: Jun. 19, 1998

[51] Int. Cl.[7] .................................................. H02H 3/00
[52] U.S. Cl. ............................. 361/92; 361/23; 361/115
[58] Field of Search ................................. 361/92, 90, 71, 361/72, 115, 23, 18

[56] References Cited

U.S. PATENT DOCUMENTS

| 5,311,108 | 5/1994 | Willard | 318/381 |
| 5,334,919 | 8/1994 | Willard | 318/375 |

OTHER PUBLICATIONS

Cleaveland/Price Inc. Bulletin DB–128A94, 1994, "Types BR, BT–D and BT–T Motor Operators for Transmission and Distribution Automation".

Cleaveland/Price Inc. Instruction Book IB–AA10–019D, Sep. 1997, "Auto Actuate (LVA) Device".

Primary Examiner—Stephen W. Jackson
Attorney, Agent, or Firm—Gordon H. Telfer

[57] ABSTRACT

A motor operator with a continuity sensor has a test current injector and a voltage sensor arranged to determine if a loss of AC voltage is due to a discontinuity, such as a blown fuse, in the circuit of a transformer powering the motor operator rather than a loss of voltage from an AC power line. A line voltage detector, such as a resistive or capacitive voltage divider, can also be used with a continuity sensor to distinguish between a discontinuity in the voltage detector and a loss of line voltage. Based on the cause determined by the continuity sensor, signals are generated either to motor operate a disconnect switch or not to.

30 Claims, 6 Drawing Sheets

MOTOR OPERATOR WITH AC POWER CIRCUIT CONTINUITY SENSOR

BACKGROUND OF THE INVENTION

1. Field of the Invention

This invention relates to motor operators for disconnect switches and their use in electrical transmission-distribution systems, and to an apparatus and method for sensing AC power circuit continuity in power supplies for such motor operators and the like.

2. Description of the Prior Art

Disconnect switches are a known type of electrical switchgear for assisting utilities in isolating faults in a transmission or distribution system. For example, if a circuit breaker trips, indicating a fault, disconnect switches at various locations in a power line can be operated to open prior to resetting the circuit breaker. After the breaker is reset, the switches are closed in a certain sequence to determine which section of the system is affected to cause another fault, thus locating the fault. Then the fault can be isolated with appropriate switches to allow most of the system to proceed to operate while the cause of the fault is removed.

Among present motor operators are units that contain within a housing a motor and power and control elements to operate the motor. The motor has an output mechanism for attachment to a disconnect switch for opening or closing the switch by either reciprocating or torsional motion. Such motor operators may have a radio that allows remote control of the motor and gives status information to a central control.

It is a common practice in present motor operators to receive power from the AC power line, for example by having a high voltage line transformer dropping line voltage to 120 v. AC with available power of about 60 volt-amperes, that is then applied to a battery charger including a charger transformer for reducing the voltage to about 14 v. and charging a DC battery through a charger rectifier. The charger transformer primary winding is connected to the line transformer secondary winding and a protection fuse is used ahead of the charger transformer. The battery, such as one of a nominal 12 v., 33 amp hour rating, is utilized to power not only the motor but, also, the radio and its associated Remote Terminal Unit (RTU) which processes input and output signals.

It has been a desire of certain utility companies to include a control feature in the motor operator circuitry to detect loss of AC voltage from the line. In some known equipment that provides this feature (as described further, for example, in Cleaveland/Price Inc. Bulletin DB-128A94, "Types BR, BT-D and BT-T Motor Operators for Transmission and Distribution Automation", 1994, and herein incorporated by reference for description of background to the invention), one of a number of status indications automatically reported back by radio to the utility's central control is loss of AC.

Other similar equipment (as described further, for example, in Cleaveland/Price Instruction Book IB-AA10-019D, "Auto Actuate (LVA) Device", September 1997, and herein incorporated by reference for description of background to the invention) goes beyond merely reporting a loss of AC and is used to initiate an automated operation of the motor and switch. Such a system, with what is sometimes referred to as an "Auto-Actuate" feature, involves monitoring the incoming AC voltage to the battery charger for any outage. That is done on the primary side of the charger transformer. Circuitry, such as one including digital counting and logic, is used to confirm a predetermined duration of the outage and, if confirmed, generate a signal to the motor control commanding operation of the motor and the switch. Once the switch operates, the system remains on standby until the radio receives a command to operate the switch again.

Typically, the switch is opened on a detected outage. If a breaker has tripped and was then reclosed, various open switches on the system are reclosed in sequence to locate and isolate the fault as in usual practice.

By way of further background it is noted that it is common practice to have motor operated disconnect switches on multiphase, such as three-phase, power lines with a switch for each phase. Also, motor operators can employ power supplies with some different characteristics in that some utilize the battery as a backup for AC and in some the battery DC voltage is used in conjunction with AC power to the motor. In the latter type of system there is a DC motor supplied with rectified AC power that has DC battery power between the rectified AC half cycles.

By way of further background, reference is made to U.S. Pat. No. 5,311,108, May 10, 1994, and U.S. Pat. No. 5,334,919, Aug. 2, 1994, for description of some known control systems for motor operators, including use of battery power developed from line voltage and having a radio unit; such descriptions are incorporated herein.

SUMMARY OF THE INVENTION

The invention has an AC power circuit continuity sensor particularly suitable for use in motor operators of the general type described but with the additional capability of distinguishing between different causes of AC voltage loss. The prior apparatus operated effectively but it is now recognized that differentiating what causes the AC loss can be beneficial for system operation.

The loss of voltage detection circuitry has previously indicated an AC loss under a number of circumstances in addition to an actual loss at the line itself. Since the charger transformer winding is conveniently used to detect voltage loss, the system is subject to an indication of AC loss that may not be desired to initiate an operation of the motor operator. For example, in the typical system, a loss of AC would be indicated, and could cause an erroneous motor and switch operation, if the loss of voltage to the charger transformer primary winding is due to a fuse in the incoming AC line being ruptured or withdrawn, a connector being disconnected, or a conductor being broken, even though the AC power line is fully powered and intact. The invention provides a distinction in the cause so a loss of voltage from the power line, on the primary side of the line transformer, will initiate the auto-actuation intended and the other causes of an indicated loss of voltage do not (though that circumstance can be reported as a status indication).

The invention involves use of a continuity sensor that checks on the continuity of the local circuitry receiving voltage from a power line so a different result occurs upon a discontinuity than if AC voltage loss is due to the power line failing or being turned off. (Continuity, or discontinuity will normally, unless the context indicates otherwise, refer to the condition of such local circuitry.) Among the forms the invention can take is a motor operator in which the continuity of power in the charging circuit is monitored by means that distinguishes between loss of voltage from the power line and other causes of loss of voltage. The charger transformer secondary winding circuit is provided with a test current injector and with a voltage sensor. A continuity sensor control is now used to give an ON command to the test current injector when any AC loss is read (such as by a voltage detector that is part of the "Auto-Actuate" system). The test current injector puts a brief pulse of current into the charger secondary winding circuit and a voltage is developed across the winding. That voltage will not be appreciable if reflected in a charger circuit that has no discontinuity. But if there is any discontinuity such as a blown fuse there is a more significant voltage across the charger secondary. The voltage sensor determines the category in which the resulting voltage falls and provides a distinguishing signal in one and not the other case. For example, a rise in voltage above a given threshold can be used to initiate radiation from a light emitting diode, the radiation is received by a phototransistor turned on to generate a signal that would block an otherwise present "Auto-Actuate" signal.

Among systems of interest for application of the invention a variety of means may be employed for detecting a loss of voltage and a variety of means may be employed for powering the motor operator. In a principal embodiment to be described, the motor operator is powered from a charger transformer connected with a line transformer. The detection of loss of voltage is performed by means, such as an opto-coupler, across the primary winding circuit of the charger transformer.

But other ways of detecting loss of voltage may be used such as a line voltage detector connected directly with the power line. Such a detector may be a resistive voltage divider or a capacitive potential transformer. Such a detector accomplishes detecting loss of line voltage even when the motor operator gets power from a fuel cell or solar panel, as well as from a transformer. When a line voltage detector is used, a continuity sensor of the invention provides assurance an outage is due to a line outage rather than a discontinuity in the line voltage detector.

These and other aspects of the invention will become more apparent from the following description and drawings.

THE DRAWINGS

EXAMPLES INCLUDING PREFERRED EMBODIMENTS

Figure 1:
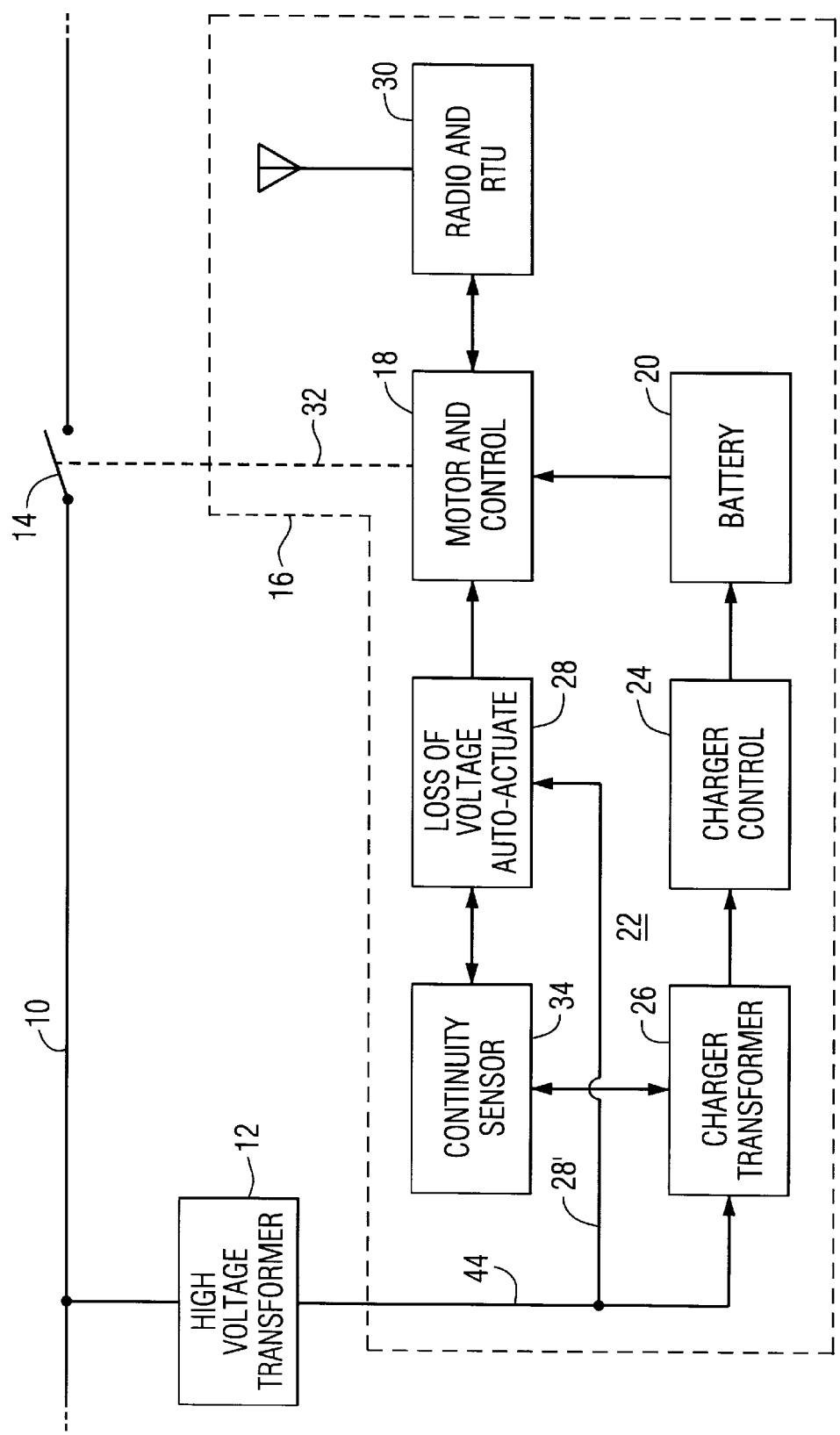
FIG. 1 is a schematic block diagram of an electrical transmission-distribution system with a motor operator in accordance with the invention.

FIG. 1 shows an AC line 10 for either long range transmission or more local distribution of power. Line 10 is connected to a high voltage line transformer 12 that steps down the voltage and may supply power, e.g. at 120 v., to service customers as well as to the following described equipment. Line 10 represents one line of a system that may have additional lines to provide the usual three phases.

A disconnect switch 14 is in the AC line 10. The elements 10, 12, and 14 may all be designed in accordance with known practices for such elements of electrical transmission-distribution systems. The following description will for clarity be directed to a motor operator 16 for one disconnect switch of such a system. (In some typical systems, an operator 16 will operate three parallel disconnect switches in respective lines of a three-phase system. Switch 14 represents any one of such three switches and transformer 12 may be connected with any one of the three lines or may be a three phase transformer connected to each of the three lines.)

Box 16 represents a typical motor operator for a disconnect switch 14 with a motor 18, including its closely related control elements, a battery 20 to supply power to the motor, and a control circuit generally indicated at 22 and having portions including a charger control 24, a charger transformer 26, and a "Loss of Voltage Auto-Actuate" circuit portion 28 that may be generally in accordance with the prior art except as subsequently described.

The motor operator 16 further includes a radio 30 including its closely related remote terminal unit (RTU) and antenna. Radio 30 may be in accordance with the prior art and, though connections are not shown here, is normally powered from a power supply that is the same as that shown applied to the motor including battery 20, charger control 24, and charger transformer 26. The radio 30 provides radio communication with a central control location for remote control, typically as encoded time-serial incoming commands and outgoing status information. Systems typically provide switch open and close commands plus opened and closed status returns with additional functions in some systems such as battery and charger condition status indications. (In the context of the present invention, the term "radio" may include telephone communication, by wire or wireless, as well as other wireless communication. Generally, any type of communication unit may be used.)

The motor 18 has an output mechanism 32 for connection with and operation of switch 14. Line transformer 12 is effectively part of the power supply and is connected with the charger transformer. The box 16 designates a unit of equipment called a "motor operator" in common usage in the utility transmission-distribution field. The described elements are, or can be, consistent with prior practice except as how they relate to and are affected by a continuity sensor 34 added to control circuit 22 to make a combination in accordance with the invention as described below.

The "Loss of Voltage Auto Actuate" circuit 28 is representative of typical prior equipment that responds to an indicated loss of AC to operate the motor 18 and, hence, switch 14. It is an option per the invention that the automated response from the circuit 28 can be designed to initiate either an automated opening or closing of switch 14.

For aid in understanding the present description unless the context indicates otherwise, "voltage loss" or the like refers to any voltage loss to the motor operator including a break in the AC line or a problem in the service from transformer 12 and "continuity" and "discontinuity" refer to the operability or nonoperability of the power supply to the motor operator, on the downstream side of line 10 and transformer 12, such as a circuit 44 by and between the high voltage transformer 12 and charger transformer 26.

Circuit 44, shown as a single line in FIG. 1, will be further described below. It generally includes conductors to bring power from the line transformer 12 to the charger transformer 26 and the loss of voltage Auto Actuate circuit 28 is connected by a line 28' to circuit 44 to sense when a loss of voltage occurs. Since line transformer 12 is normally pole-mounted and motor operator 16 is normally near ground level, the circuit 44 can extend a substantial distance making it vulnerable to having a discontinuity, in addition to the fact any fuse in circuit 44 makes the circuit subject to interruption.

The system of FIG. 1 is shown with a continuity sensor 34. After the loss of voltage detection elements of circuit 28 indicate a loss of voltage, the continuity sensor 34 determines the cause.

Figure 2:
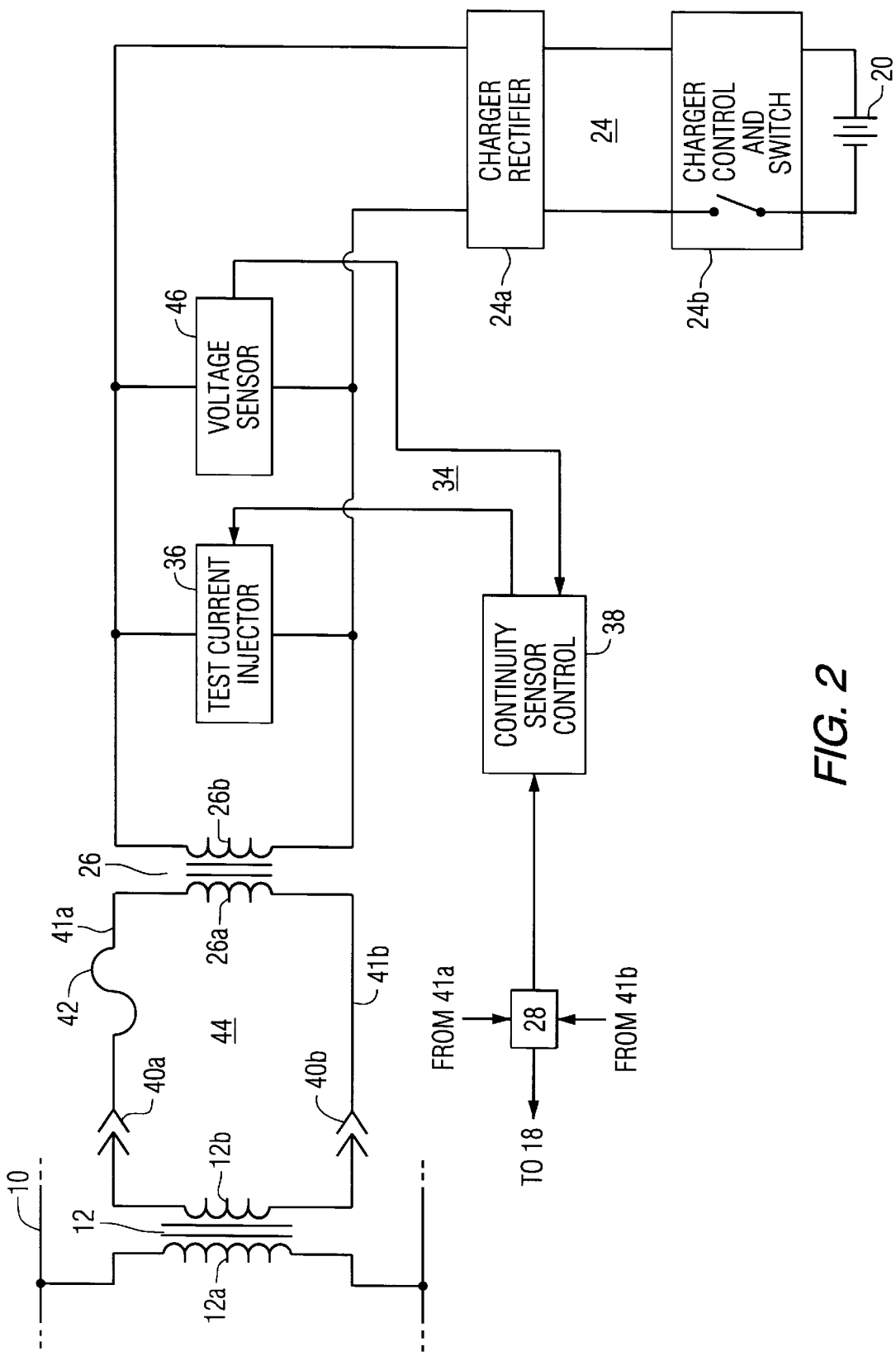
FIG. 2 is a schematic diagram of a portion of a motor operator including an example of a continuity sensor.

Referring to FIG. 2, some key elements of a continuity sensor 34 are shown in relation to some other elements of a system such as that of FIG. 1.

In FIG. 2 line transformer 12 is shown with a primary winding 12a connected to line 10 and a secondary winding 12b connected through connectors 40a and 40b and conductors 41a and 41b to primary winding 26a of the charger transformer 26 in a primary side charger transformer circuit 44. Fuse 42 is in the circuit. The charger transformer 26 has its secondary winding 26b connected to a charger control circuit 24 here shown with a charger rectifier 24a and a charger control and charger switch portion 24b that then supplies battery 20. Circuit 28, connected in a circuit branch across circuit 44, detects any loss of voltage in circuit 44.

In the continuity sensor 34, a test current injector 36 is connected so, upon command from a continuity sensor control 38, to be described further below, it injects a voltage limited current pulse into the secondary side of charger transformer 26. This pulse has, for example, a duration of about 8 ms., a maximum voltage amplitude of about 10 v., and a current on the order of 0.1 a. The injected current pulse into 26b checks the continuity of the primary side charger transformer circuit 44 and also the secondary winding 26b and its connections with the charger control 24. (A discontinuity on the secondary winding side of transformer 26 is not as likely to occur, however, as on the primary side in circuit 44.) The current pulse is essentially short circuited when no discontinuity is present so very little voltage develops across winding 26b.

A voltage sensor 46, also across winding 26b, sees little voltage under such conditions. However, if the continuity of circuit 44 is interrupted anywhere, a substantial voltage pulse will appear on the winding 26b and the voltage sensor 46. That pulse generates a signal back to the continuity sensor control 38 to effect the desired control functions (e.g., to give a blocking signal for the Auto Actuate circuit 28 of FIG. 1).

It is possible for the charger switch in part 24b to be either open or closed according to the present charge state of the battery 20. However, by sensing the pulse voltage before the charger rectifier 24a and by keeping the injected current's maximum voltage below battery potential, the rectifier isolates the pulse energy from the battery regardless of the state of the charger switch.

FIG. 2 gives only an example of the location of the test current injector 36 and the voltage sensor 46 where they are both connected across the charger transformer secondary winding 26b where the normal voltage is less than on the primary winding 26a. In general, however, a test current injector and/or a voltage sensor can be arranged across primary winding 26a and provide the functions desired in the continuity sensor 34.

Figure 3:
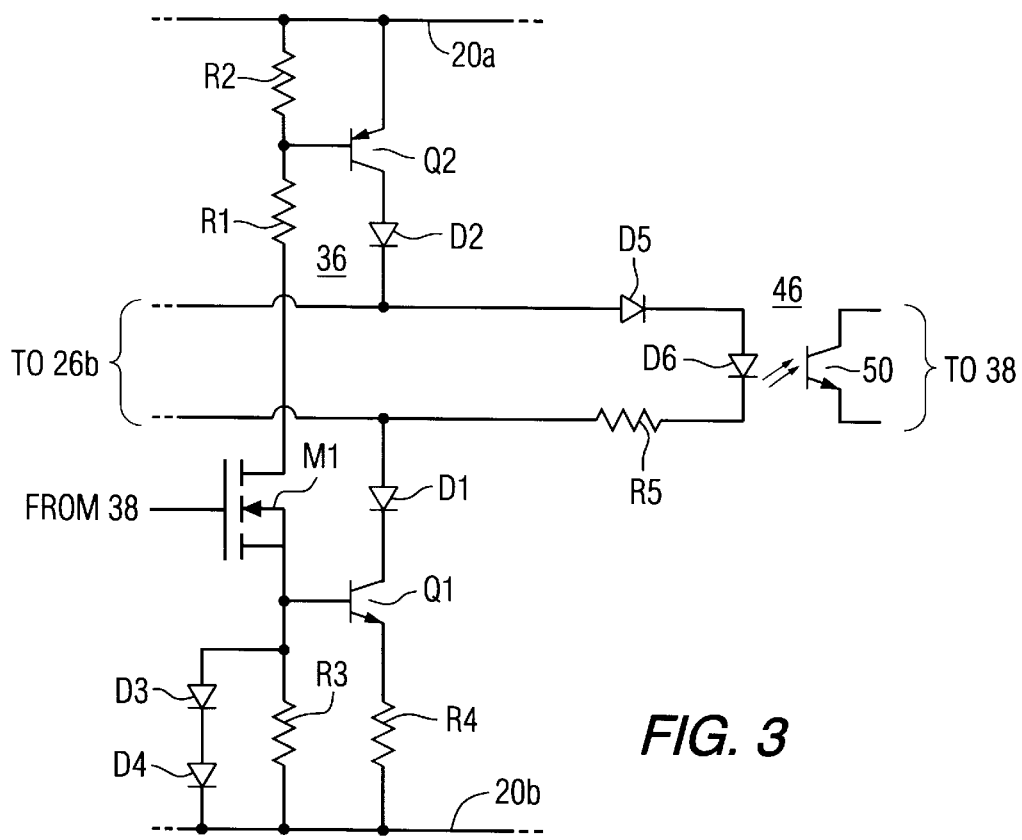
FIG. 3 is a schematic circuit diagram of a test current injector and a voltage sensor of a continuity sensor.

FIG. 3 shows details of an example of a test current injector 36 and a voltage sensor 46.

The injector 36 includes a number of interconnected elements across positive and negative battery terminals 20a and 20b including an N-channel MOSFET M1 with its source terminal connected to the base of an NPN transistor Q1 and its drain terminal connected to the base of a PNP transistor Q2 through a resistor R1. Additional resistors R2, R3, R4 are shown respectively between battery terminal 20a and the base of Q2, between battery terminal 20b and the base of the Q1 and between terminal 20b and the emitter of Q1. The collector of each of Q1 and Q2 is connected through respective diodes D1 and D2 to leads to the charger transformer secondary 26b. Additional diodes D3 and D4 are between the base of Q1 and the negative supply 20b.

When a pulse signal is received at the gate of M1 from the continuity sensor control 38 indicating absence of AC voltage, M1 turns on and a current pulse is developed at the collector outputs of Q1 and Q2 that go to winding 26b and voltage sensor 46. Diodes D1 and D2 maintain unidirectional current flow. Resistors R2 and R3 keep the respective transistors Q2 and Q1 off in the absence of any signal that turns on M1. Q1 and Q2 turn on when M1 is conductive. Q1, R4, D3 and D4 together cooperate as parts of a constant current source of a known type. R4 acts as a current feedback resistor and D3 and D4 limit the voltage rise at the base of Q1 to be no more than about 0.7 v. each, or 1.4 v.

Voltage sensor 46, in this example, comprises a branch connected to winding 26b, and between D2 and D1, with a diode D5, a light emitting diode (LED) D6 and a resistor R5. The sensor 46 initiates no effect on motor operation unless the voltage across the LED is at least of the threshold amount needed to turn it on and produce sufficient radiation to turn on a phototransistor 50. When transistor 50 conducts and a pulse signal goes back to continuity sensor control 38, the sensor 46 shows that the apparent loss of AC voltage to transformer 26 is due to a discontinuity in the charger transformer circuit rather that a loss of power from line 10 or transformer 12.

Such a signal from the voltage sensor can be variously used to influence the operation of the system or to provide status information. In one example, continuity sensor 34 of FIG. 2, including the current injector 36, voltage sensor 46 and continuity sensor control 38, allows auto-actuate circuit 28 to initiate an auto-open signal to motor 18 upon any loss of AC except if voltage sensor 46 tells circuit 28 that the loss of AC voltage is not due to a condition affecting the line 10 but due to a discontinuity in circuit 44 or elsewhere in the charger circuit.

Auto Actuate circuit 28 of FIG. 1 can be configured in accordance with known practice to detect any apparent loss of AC voltage and to initiate a predetermined operation of motor 18 if one exists. Part of that process has included determining if the loss satisfies predetermined conditions, such as existing for a predetermined time. Auto Actuate circuit 28 may, as before, include a voltage detector (not shown) such as one having an opto-coupler including an LED and a phototransistor with a drop in signal from the phototransistor starting a timer (such as a digital counter) confirming a voltage loss lasts for a predetermined time, such as 1 to 99 seconds. Whatever means is used in circuit 28 to detect loss of voltage, various means can be used to initiate motor operation including, for example, electronic (low voltage) sequencing and logic elements or a power relay circuit.

The continuity sensor 34 is responsive to a "check continuity" signal from the Auto Actuate circuit to confirm, before the circuit 28 causes an auto-actuation, that the power loss in fact exists due to the line rather than from other causes such as a blown fuse or a broken conductor to the equipment at ground level. For the purposes of the invention, a change in Auto Actuate circuit 28 from such equipment formerly used without the invention is that after confirming a certain duration of voltage loss but before actuating the motor, a signal, here called a "check continuity" signal is developed in circuit 28 and applied to the continuity sensor 34. The steps performed in Auto Actuate circuit 28 therefore, in this example, include detecting a voltage loss, determining existence of the voltage loss for a predetermined time, applying a check continuity signal to continuity sensor 34 if a voltage loss endures to the predetermined time, and then only after the functioning of the continuity sensor 34 shows the voltage loss is not due to a discontinuity in the charger circuit, applying an actuating signal to the motor.

As to the method of operation of the continuity sensor 34, in the present example, a check continuity signal from the Auto Actuate circuit initiates injecting a current pulse into the charger transformer secondary winding 26b and responding to a high voltage signal across that winding as a result of the injected current to inhibit the application of an actuating signal from the Auto Actuate circuit to the motor. Variations in the steps of the procedure, as well as the elements for performing them, from those specifically described may be used in accordance with common design practices.

The continuity sensor control 38, also forming part of continuity sensor 34, can be variously implemented according to any of a number of well known timing and sequencing circuits.

Figure 4:
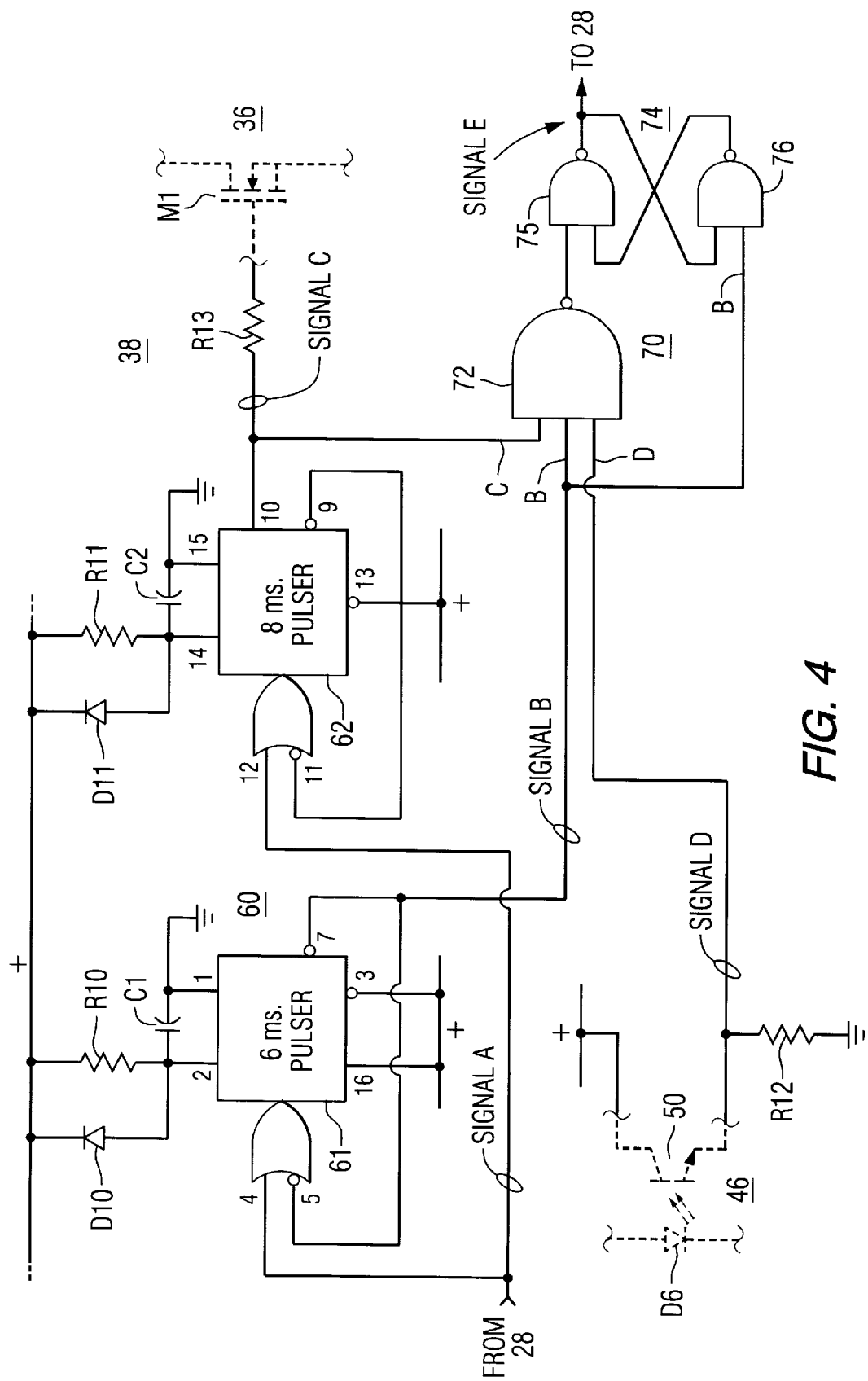
FIG. 4 is a schematic circuit diagram of a continuity sensor control for a system.

For example, FIG. 4 shows a continuity sensor control 38 that performs such functions, in conjunction with current injector 36 and voltage sensor 46, in an embodiment of continuity sensor 34.

FIG. 4 includes circuitry energized by a power supply that may be battery 20. There is a timer section 60 for supplying a brief pulse to initiate action by the test current injector 36. Circuit 38 also includes a logic section 70 for processing a signal from the voltage sensor 46 with one or more timer signals and reaching a result seen by the auto-actuate circuit.

In this example, timer section 60 includes two pulsers 61 and 62 that are each started by a check continuity signal (signal "A") from circuit 28. Pulsers 61 and 62 are arranged with the associated circuitry, as shown, to generate signals B and C respectively. Signal B includes a pulse for a duration such as about 6 ms. and signal C has a pulse for about 8 ms. with a further difference that signal B is normally high (e.g., a logic "1") with its pulses going low (or "0") while signal C does the opposite (see FIG. 5). As shown, signal C goes to M1 in current injector 36 and also to the logic section 70. Signal B goes to the logic section, also.

In the logic section 70, a NAND gate 72 receives as inputs signals B and C and also a signal D. Signal D is developed from voltage sensor 46 and is, in this case, low unless phototransistor 50 turns on. Logic section 70 also includes a flip-flop 74, made from two NAND gates 75 and 76, that serves as a memory. Gate 75 has one input from gate 72 and another from the output of gate 76. Gate 76 has signal B as one input and another from the output of gate 75.

The flip-flop 74 is reset by the start of a 6 ms. pulse in signal B and stays reset until gate 72 determines a point at which the signal B pulse ends and the signal C pulse is still high and, also, the signal D is high.

At the output of logic 70, signal E goes high at 6 ms. after signal A is received and only if signal D shows a non-power line discontinuity. Signal E is an "Inhibit Auto Actuate" signal that blocks the Auto Actuate circuit 28 from performing its originally intended function.

By way of further example, the following table further identifies some elements illustrated in FIG. 4:

| | |
|---|---|
| Power supply | +12 v. |
| Pulsers 61 and 62 | Each one-half of a CD4538 timer chip with terminals 1 through 16 marked per actual device |
| Diodes D10 and D11 | Each 1N4148 |
| R10 | Approx. 60K ohms |
| R11 | Approx. 80K ohms |
| C1 and C2 | Each approx. 0.1 $\mu$f |
| R12 and R13 | Each approx. 10K ohms |

Other specific elements may be selected in accordance with practices in the art.

Figure 5:
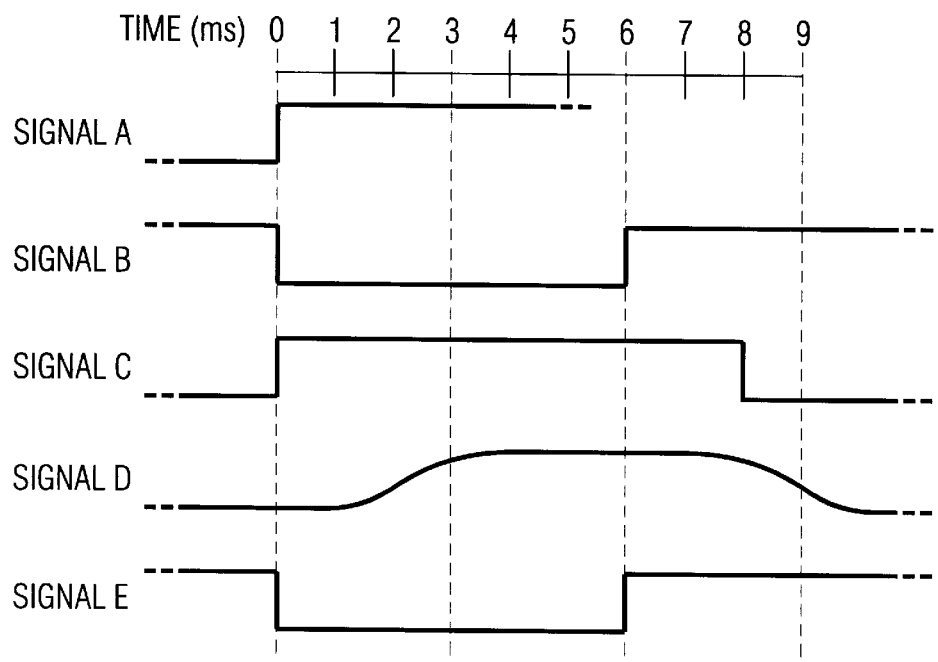
FIG. 5 is a timing chart for signals in the circuit of FIG. 4.

FIG. 5 is a timing chart illustrating the signals A, B, C. D, and E during the above described operation.

Figure 6:
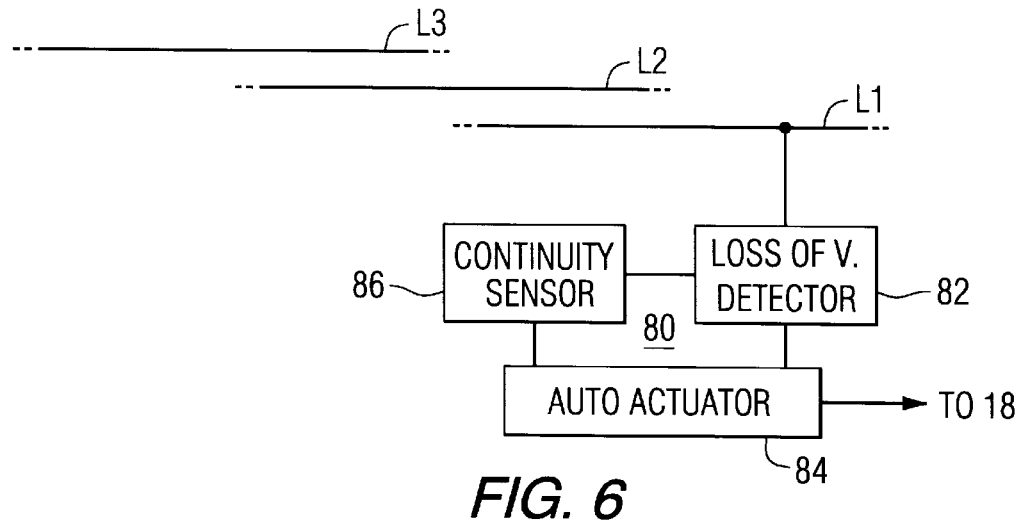
FIG. 6 is a schematic block diagram illustrating the invention.

FIG. 6 is to provide a further perspective on forms which the invention may take. It shows a transmission-distribution power system with respective three phase line conductors L1, L2, and L3. Line L1 has a loss of voltage auto actuate circuit 80, that contains a continuity sensor, connected with it. Each of the other lines L2 and L3 may also be connected with a circuit similar to circuit 80.

Three principal elements of circuit 80 shown in FIG. 6 are a loss of voltage detector 82 that is connected with an auto-actuator circuit 84 to initiate a motor operation upon detection of a loss of voltage due to a line fault, and a continuity sensor 86 that determines whether a loss of voltage detected by circuit 82 is due to a local discontinuity that is not intended to initiate a motor operation.

Figure 7A:
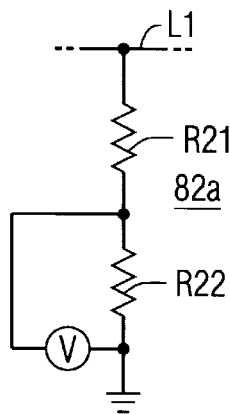
FIGS. 7A and 7B are schematic diagrams of line voltage detectors for use in the invention.
Figure 7B:
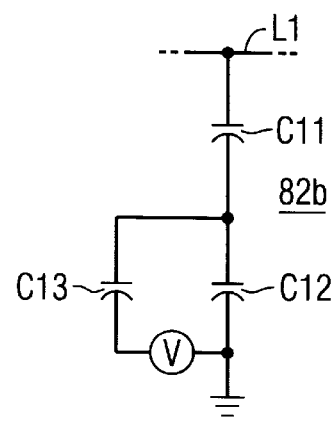

The loss of voltage detector 82 can take various forms besides detection across a transformer winding. Some embodiments of detector 82 are shown in FIGS. 7A and 7B. These loss of voltage detectors are sometimes referred to herein as line voltage sensors or line voltage detectors because of their direct connection with the line L1, or line 10 of FIG. 1. In FIG. 7A a resistive voltage divider 82a has resistors R21 and R22 in series between line L1 and ground. The resistor R21 is quite large, such as about 200 to 300 megohms where L1 is carrying about 15,000 v. AC. Resistor R22 is smaller, such as about 100 to 200 kilohms. The voltage across R22 is limited to a low level, such as about 0.8 v. maximum, by the resistances being so large only a small current is drawn. However, a drop to zero volts across R22 will occur if there is a loss of voltage from the line that would make it desirable to operate the Auto Actuator circuit 84.

The voltage across R22 will also drop to zero if there is a discontinuity in any of the conductors of the voltage detector 82a, which typically must extend from an elevated line to near ground level. To avoid an unintended operation of the auto actuator circuit 84, a continuity sensor 86 provides a check of the continuity of the circuitry of the loss of voltage detector when a loss of voltage has been indicated.

FIG. 7B shows another form the loss of voltage detector 82 can take. Here, a detector 82b is shown that is a capacitive potential transformer comprising capacitors C11, C12, and C13. The nature and operation of devices such as detectors 82a and 82b are well known.

Figure 8:
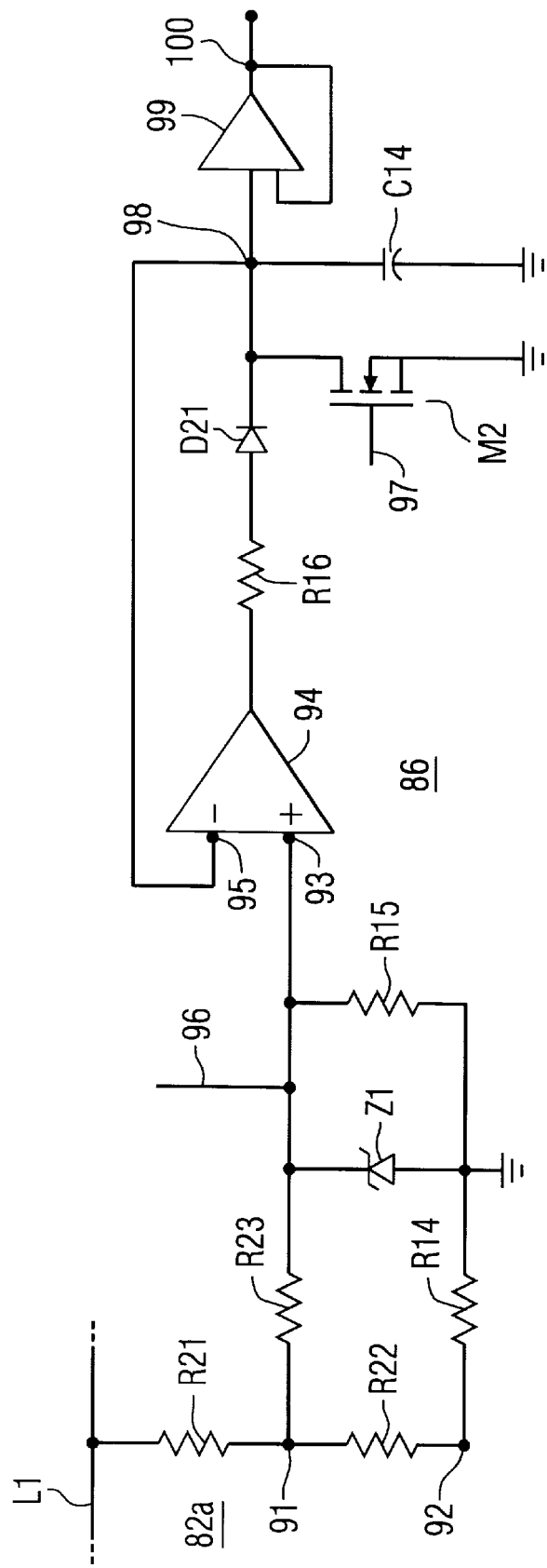
FIG. 8 is a circuit schematic of a continuity sensor with a resistive voltage divider to detect line voltage.

FIG. 8 is an example embodiment of a continuity sensor 86 that works with a resistive divider 82a. The terminals 91 and 92 of R22 are connected through respective resistors R23 and R14 (e.g., 1 kohm each) to the terminals of another resistor R15 (e.g., 1 megohm) that has its high side connected to the positive input terminal 93 of an opamp 94. Opamp 94 is a unity gain amplifier connected in a peak detector circuit with R16, D21, M2, and C14. Terminal 93 also sees a voltage pulse from terminal 96 that is developed in other signal processing circuitry (not shown), also connected with terminals 91 and 92, when a loss of voltage occurs across R22. The pulse voltage at the terminal 96 can, for example, be 5v. The resistive voltage divider including R22 and R15 then sets a voltage at opamp terminal 93 at a level that depends on whether R22 is in the circuit (and no discontinuity exists in the voltage detector) or R22 is not connected as it should be. For example, the voltage at terminal 93 may be about 4.5 v. if there is a discontinuity and about 2.5 v. if there is none.

The negative input terminal 95 of opamp 94 has a voltage set by a loop from the output of the opamp including resistor R16 and diode D21, with capacitor C14 connected between terminal 95 and ground that is charged by the output of opamp 94.

In parallel with the capacitor C14, there is a circuit branch with MOSFET M2. Since D21 keeps C14 from discharging otherwise, M2 is to discharge C14 when a reset signal is applied to its gate 97. That occurs when a pulse is developed by other circuitry, now shown, that directs the continuity sensor 86 to revert to its initial state.

The output from opamp 94 (through R16 and D21) is applied to the input 98 of opamp 99 which is arranged to serve as a voltage follower or buffer amplifier. Its output, at terminal 100, is high if there is a discontinuity in the voltage detector or otherwise is low. Other circuitry (not shown) uses the output signal occurring when there is a discontinuity to block an autoactuation of the line switch.

A similar continuity sensor as that of FIG. 8 can be arranged to work with a capacitive potential transformer 82b. Both versions of line voltage sensor 82a and 82b are satisfactory. They are particularly useful in any equipment where power to the motor operator is not from the AC line but rather a source such as a solar panel or fuel cell.

Referring again to FIG. 6, in one form of operation auto-actuator 84 includes logic to produce a signal starting a timer only if voltage detector 82 shows a loss of voltage and continuity sensor 86 shows circuit continuity. The timer has a set time to run before it allows a pulse generator in the auto-actuator to produce a signal operating the motor of a motor operator. The timer can be subject to various conditions. Provision can be readily made for the timer to be reset if the voltage is restored before the timer runs the preset time. There can also be a timer override that stops the operation of the pulse generator when voltage has been restored, even if the timer has run the preset time. Further provision can be made to make sure an output from the pulse generator can only occur if the motor operator is fully connected for initial operation.

Motor operators can be provided with options for the user that affect the loss of voltage detector and continuity sensor. For example, a motor operator may have the capability to be operated with power from either an AC power transformer, as in FIGS. 1 and 2, or from a source independent of the power line such as a solar panel or fuel cell. Line voltage sensors 82a and 82b of FIGS. 7A and 7B do not depend on a power transformer.

Figure 9:
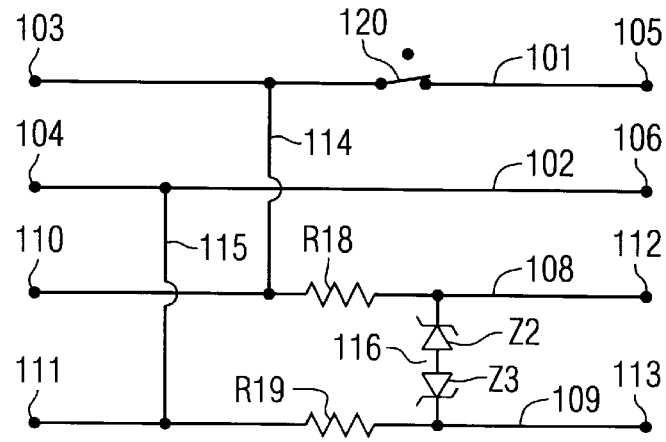
FIG. 9 is a circuit schematic of part of an embodiment of the invention.

FIG. 9 shows part of a different embodiment for applying a continuity sensor of the general character of the continuity sensor 86 of FIG. 8. FIG. 9 also illustrates how a user can be provided an option to use different types of loss of voltage detectors.

FIG. 9 shows a first pair of conductors 101 and 102 with respective terminals 103 and 104 for connection with the secondary side of a line transformer (like transformer 12 of FIG. 2) and terminals 105 and 106 for connection with the primary side of a charger transformer (like transformer 26 of FIG. 2). Normally, conductors 101 and 102 would be downstream from the fuse 42 shown in the transformer circuit of FIG. 2.

FIG. 9 also shows a second pair of conductors 108 and 109 with terminals 110 and 111 on the left and terminals 112 and 113 on the right. Terminals 110 and 111 are for connection with a line voltage sensor (like sensor 82a of FIG. 8) and terminals 112 and 113 are for connection with a continuity sensor (like continuity sensor 86 of FIG. 8).

Jumper 114 connects conductors 101 and 108 and jumper 115 connects conductors 102 and 109. The jumpers may be cut (or left unconnected) or may be left intact (or connected) by a user of the equipment to achieve either of two ways of operating.

If the jumpers 114 and 115 are cut, the lower conductors 108 and 109 are used with circuitry like circuit 86 of FIG. 8 with a line voltage sensor such as 82a (FIG. 7A) or 82b (FIG. 7B). For that purpose, terminals 110 and 111 would be connected across a component, such as R22, of the line voltage sensor and terminals 112 and 113 would be connected to a continuity sensor 86. Thus, in the context of FIG. 8, conductors 108 and 109 would be located between terminals 91 and 92 and the left side of resistors R23 and R14. In FIG. 9, a voltage clamp 116 comprising back to back Zener diodes Z2 and Z3 is connected across conductors 108 and 109 and, also, additional resistors R18 and R19 (e.g., approx. 13 kohm) are in respective conductors 108 and 109.

When the jumpers 114 and 115 are cut, and a line voltage sensor is used, either there is a power supply independent of transformer 12 or else the line voltage sensor is used for loss of voltage detection while a line transformer 12 supplies voltage.

In the case where the user opts not to use a line voltage sensor, jumpers 114 and 115 are left intact. In this case, a power transformer 12 is used both as a voltage source and also as a loss of voltage detector, along with continuity sensor 86. That is, without an opto-coupler or the like in an autoactuation circuit, and without circuitry like 34 of FIG. 2, the intended functions are achieved. The continuity sensor 86 receiving inputs from jumpers 114 and 115 will detect the presence or absence of voltage across conductors 101 and 102 and produce a characteristic low or high signal at output 100 of continuity sensor 86. A high level signal at terminal 100 would be supplied to logic that results in opening a relay 120 in conductor 101 and, also, to terminal 96 of continuity sensor 86. Then circuit 86 actually checks the continuity of the transformer 12 circuitry. If conductor 101 was continuous or the relay 120 were left closed, the primary winding of the charger transformer would lead the continuity sensor to see no discontinuity, even if a fuse such as 42 were blown or other such discontinuity was present. Relay 120 is, therefore, located on the downstream side of jumper 114.

The preceding description illustrates how a continuity sensor such as circuit 86 is responsive to the presence or absence of a voltage at its input terminals 91 and 92 and those terminals can be connected in various ways. In addition, circuit 86 can be varied in numerous ways from the specific form shown in accordance with known practices in electronic signal processing. For example, one may include an additional amplifier stage to boost the voltage to terminal 93 of opamp 94. In addition, the opamp 94 may be connected with its output connected to a comparator that compares the voltage level with a reference voltage (rather than amplifier 99 which is a buffer amplifier whose output follows its input and is compared to a reference in other controller circuitry, not shown).

Among the applications that can be made of a continuity sensor together with a loss of voltage detector is to have a status report to a central control location, by radio, even without an auto actuation of the motor operator or disconnect switch.

It will be apparent from the foregoing how those skilled in the art may readily practice the invention, both in its apparatus and method aspects, and further, how forms of the invention may vary from those specifically shown and described above. For example, a number of described functions, as well as possible additional ones, may be performed with a microprocessor. Also, the invention may be applied in systems involving equipment other than a motor operator for a disconnect switch and also in systems in which the power supply is other than a DC battery charged by an AC source.

What is claimed is:

1. A motor operator, for a switch in an electrical system, comprising:
   a motor with an output mechanism to operate the switch;
   a battery connected to supply power to the motor;
   a charging circuit connected with the battery and to receive power from a power line; and
   a control circuit arranged to detect a loss of voltage to the charging circuit with the capability to distinguish between a loss of voltage from the power line and charging circuit discontinuities that produce a loss of voltage in the charging circuit whereby a loss of voltage from the power line initiates an operation of the motor that is not performed upon a loss of voltage due to said discontinuities.

2. The motor operator of claim 1 wherein:
   the control circuit includes a continuity sensor comprising a test current injector to supply a current pulse to the charging circuit and a voltage sensor to read voltage across the charging circuit resulting from the current pulse.

3. The motor operator of claim 2 wherein:
   the continuity sensor further includes a continuity sensor control that gives an ON command to the test current injector under predetermined conditions and receives a resulting signal from the voltage sensor.

4. The motor operator of claim 3 wherein:
   the voltage sensor of the continuity sensor has a low level output signal when the charging circuit is continuous and a higher level output signal when the charging circuit is discontinuous whereby the low level output signal allows the control circuit to initiate the operation of the motor and the higher level output signal does not.

5. The motor operator of claim 4 wherein:
   the charging circuit includes a charger transformer with a primary winding and a secondary winding, connectors for connection with a line power source, conductors from the connectors to respective ends of the primary winding, and a fuse between a connector and one of the ends of the primary winding; and,
   the test current injector and the voltage sensor of the continuity sensor are connected across a winding of the charger transformer.

6. The motor operator of claim 1 further comprising:
   a communication device with a transmitter and a receiver to communicate with a central control remote from the motor operator, the battery and the charging circuit also being arranged to supply power to the communication device, the communication device being arranged to initiate an operation of the motor upon receiving a command signal from the central control.

7. The motor operator of claim 5 wherein:
   the test current injector and the voltage sensor of the continuity sensor are connected across the secondary winding of the charger transformer.

8. The motor operator of claim 6, wherein:
   the communication device is also arranged to communicate to the central control a signal indicating the performance of motor operations.

9. The motor operator of claim 7 wherein:
   the test circuit injector comprises a normally off circuit portion that is arranged to conduct and supply current in the secondary winding of the charger transformer when an ON command from the continuity sensor control is received and to generate a voltage signal across the secondary winding applied to the voltage sensor.

10. The motor operator of claim 9 wherein:
    the voltage sensor comprises a first solid state device responsive to a predetermined magnitude of the voltage signal of the secondary winding to emit radiation and a second solid state device arranged to change conductive state in response to radiation from the first solid state device.

11. An electrical transmission-distribution system comprising:
    a power line of at least one phase carrying AC power;
    a disconnect switch in series with the power line;
    a motor for operating the disconnect switch;
    an electrical power supply for the motor comprising a battery, means for charging the battery by power from the power line, and means for controlling operation of the motor according to predetermined conditions of the power supply, said means for controlling operation comprising means for developing a voltage loss signal indicating voltage not reaching the means for charging and means for developing a discontinuity control signal indicating a discontinuity in the means for charging the battery.

12. The system of claim 11 wherein:
    the means for charging includes a high voltage line transformer with a primary winding coupled with the power line and a secondary winding, a lower voltage charger transformer having a primary winding and a secondary winding, means for connecting the primary winding of the charger transformer with the secondary winding of the line transformer including a circuit with connectors, conductors and a fuse;
    said means for developing a discontinuity control signal comprises a test current injector and a voltage sensor connected with the secondary winding of the charger transformer, the test current injector is arranged to receive a signal from the means for developing a discontinuity control signal and to inject current into the secondary winding of the charger transformer upon an indication of a loss of voltage in the power supply, the voltage sensor is arranged to develop a voltage sense signal which is of a first level when the circuit of the primary winding of the charger transformer and the secondary winding of the line transformer has a discontinuity and a second level when the circuit has continuity.

13. The system of claim 12 wherein:

the voltage sensor comprises a first solid state device responsive to the voltage of the predetermined magnitude to emit radiation and a second solid state device arranged to change conductive state in response to radiation from the first solid state device.

14. The system of claim 11 wherein:

the means for developing a voltage loss signal operates to automatically actuate an operation of the motor upon a voltage loss signal except when the means for developing a discontinuity control signal has first produced a discontinuity control signal.

15. A method of operating a motor operator of a disconnect switch in an electrical transmission-distribution system where a power line supplies power to drive the motor operator through a power supply comprising a battery in a charging circuit coupled with the power line including a high voltage line transformer and a charger transformer having a primary winding intended to be connected with a secondary winding of the line transformer, comprising the steps of:

monitoring voltage from the charger transformer to detect a loss of voltage;

distinguishing, upon a detection of a loss of voltage, such loss due to absence of voltage on the power line and such loss due to a discontinuity in the intended connection between the line transformer secondary winding and the charger transformer primary winding or in the circuit of the secondary winding of the charger transformer;

said distinguishing being performed by injecting a current into a winding of the charger transformer and sensing voltage developed across a winding of the charger transformer as a result of the injected current.

16. The method of claim 15 further comprising:

after the sensing of the voltage indicates a sensed voltage below a predetermined threshold level, developing a signal for operating the motor operator according to a predetermined instruction when a loss of voltage is due to a loss of line power, which signal is not developed when the sensing of the voltage indicates a sensed voltage of at least the predetermined threshold level.

17. The method of claim 16 wherein:

the injecting of current and the sensing of voltage are performed on the secondary winding of the charger transformer.

18. An AC power circuit continuity sensor comprising:

a test current injector arranged for connection with a transformer winding;

a voltage sensor connected to respond to a predetermined level of voltage resulting from current injection by the test current injector; and a continuity sensor control comprising a first source of a signal to initiate current injection by the test current injector and a second source of a signal to show the voltage sensor has responded to the voltage resulting from current injection.

19. The sensor of claim 18 wherein:

the first signal source of the continuity sensor control comprises a timer section that starts pulses (B and C) of each of two different durations upon an input signal (A) to the continuity sensor control, where pulse C is longer than pulse B, and;

the second signal source of the continuity sensor comprises a logic section processing signals B and C with a signal D generated by the voltage sensor to generate a control signal E.

20. The sensor of claim 18 is further in combination with a charger transformer of a motor operator capable of operating a disconnect switch, the charger transformer secondary winding being connected with the test current injector.

21. The sensor of claim 19 in combination with:

a charger transformer of a motor operator capable of operating a disconnect switch, the charger transformer secondary winding being connected with the test current injector; and wherein the control signal E is applied to an auto-actuate circuit portion of the motor operator to block an otherwise automatic operation of the motor operator.

22. An electrical system comprising:

an AC power line;

a voltage detector circuit for indicating a loss of voltage from the line;

an auto-actuation circuit for initiating a predetermined operation in the electrical system upon a loss of voltage from the line; and a continuity sensor for checking the continuity of the voltage detector circuit and to block action by the auto-actuation circuit if detected loss of voltage is due to a discontinuity in the voltage detector circuit.

23. The system of claim 22 wherein:

the voltage detector circuit comprises a sensor connected across a transformer winding that gets voltage from the AC power line.

24. The system of claim 22 wherein:

the voltage detector circuit comprises a line voltage sensor connected to the AC power line.

25. The system of claim 23 wherein:

the continuity sensor comprises a test current injector that injects a test current into a winding of the transformer upon an indicated loss of voltage from the voltage detector circuit and a voltage sensor that reads a voltage across a winding of the transformer resulting from the injected test current.

26. The system of claim 22 wherein:

the continuity sensor comprises a detecting circuit with an input set at either of two voltage levels depending on a continuity or discontinuity indicated by the voltage detector circuit.

27. The system of claim 24 wherein:

the line voltage sensor is a resistive voltage divider or a capacitive potential transformer.

28. The system of claim 26 wherein:

the continuity sensor is connected with a voltage detector circuit that is selected from either one of a resistive voltage divider or a capacitive potential transformer.

29. The system of claim 26 wherein:

the continuity sensor is connected with a circuit of a transformer arranged to supply power to equipment in the system and the voltage detector circuit includes the circuit of the transformer.

30. The system of claim 26 wherein:

the continuity sensor has terminals available for connection with a line voltage sensor that is selected from either one of a resistive voltage divider or a capacitive potential transformer and also has a pair of accessible jumper conductors to a circuit of a transformer arranged to supply power to equipment in the system whereby the pair of jumper conductors are interrupted by a user when said terminals are connected with a line voltage sensor and are otherwise connected.

* * * * *